United States Patent
Palombo et al.

[11] Patent Number: 5,387,996
[45] Date of Patent: Feb. 7, 1995

[54] METHOD OF OBTAINING A NARROW FIELD OF VIEW SCAN

[75] Inventors: Mario P. Palombo, Manhattan Beach; David Fink, Los Angeles, both of Calif.

[73] Assignee: Hughes Aircraft Company, Los Angeles, Calif.

[21] Appl. No.: 915,226

[22] Filed: Jul. 20, 1992

[51] Int. Cl.[6] .............................................. G02B 26/08
[52] U.S. Cl. .................................. 359/218; 359/219; 250/236
[58] Field of Search ............... 359/216, 217, 218, 219; 250/234, 235, 236

[56] References Cited

U.S. PATENT DOCUMENTS

| | | | |
|---|---|---|---|
| 3,813,140 | 5/1974 | Knockeart | 359/218 |
| 4,030,806 | 6/1977 | Goshima et al. | 359/217 |
| 4,213,157 | 7/1980 | DeBenedictis et al. | 359/217 |
| 4,230,394 | 10/1980 | Brueggemann et al. | 359/216 |
| 4,388,651 | 6/1983 | Sherman | 359/217 |
| 5,044,710 | 9/1991 | Iwai et al. | 359/216 |

OTHER PUBLICATIONS

"A New Type Of Infrared Scanning System", Lars Karisson, AGEMA Infrared Systems AB, Proceedings of the SPIE, vol. 805, Optical Components and Systems (1987), The Hague, Netherlands.

*Primary Examiner*—Loha Ben
*Assistant Examiner*—Thomas Robbins
*Attorney, Agent, or Firm*—Michael W. Sales; Wanda K. Denson-Low

[57] ABSTRACT

Disclosed is a scanning device (10) having a very fast raster scan and a small angle field of view. The scanning device (10) incorporates a rotating polygon scanning wheel (12) in which a beam of light (24) is reflected off of a first facet (14') of the wheel (12). A reflected beam (32) from the first facet (14') is directed through an optical subsystem that reverses the scanning direction of the beam and redirects the beam onto a second facet (14") of the scanning wheel (12). Since the subsystem optics reverses the scan of the beam, the second facet (14") scans the beam in an opposite direction to that of the first facet (14') and only the difference between the two scans remains. In a first embodiment, the optical subsystem magnifies or demagnifies the beam such that the angle of scan is enlarged or reduced, and thus the second scan will not completely cancel the first scan. Consequently, a very narrow field of view of a particular scene can be scanned very quickly. In an alternate embodiment, the size of the scan is altered by either altering the convergence or divergence of the beam between the two scanning reflections to achieve the small angle scan. In yet another embodiment, the small angle scan is achieved by substantially, but not entirely, reversing the scan direction.

16 Claims, 4 Drawing Sheets

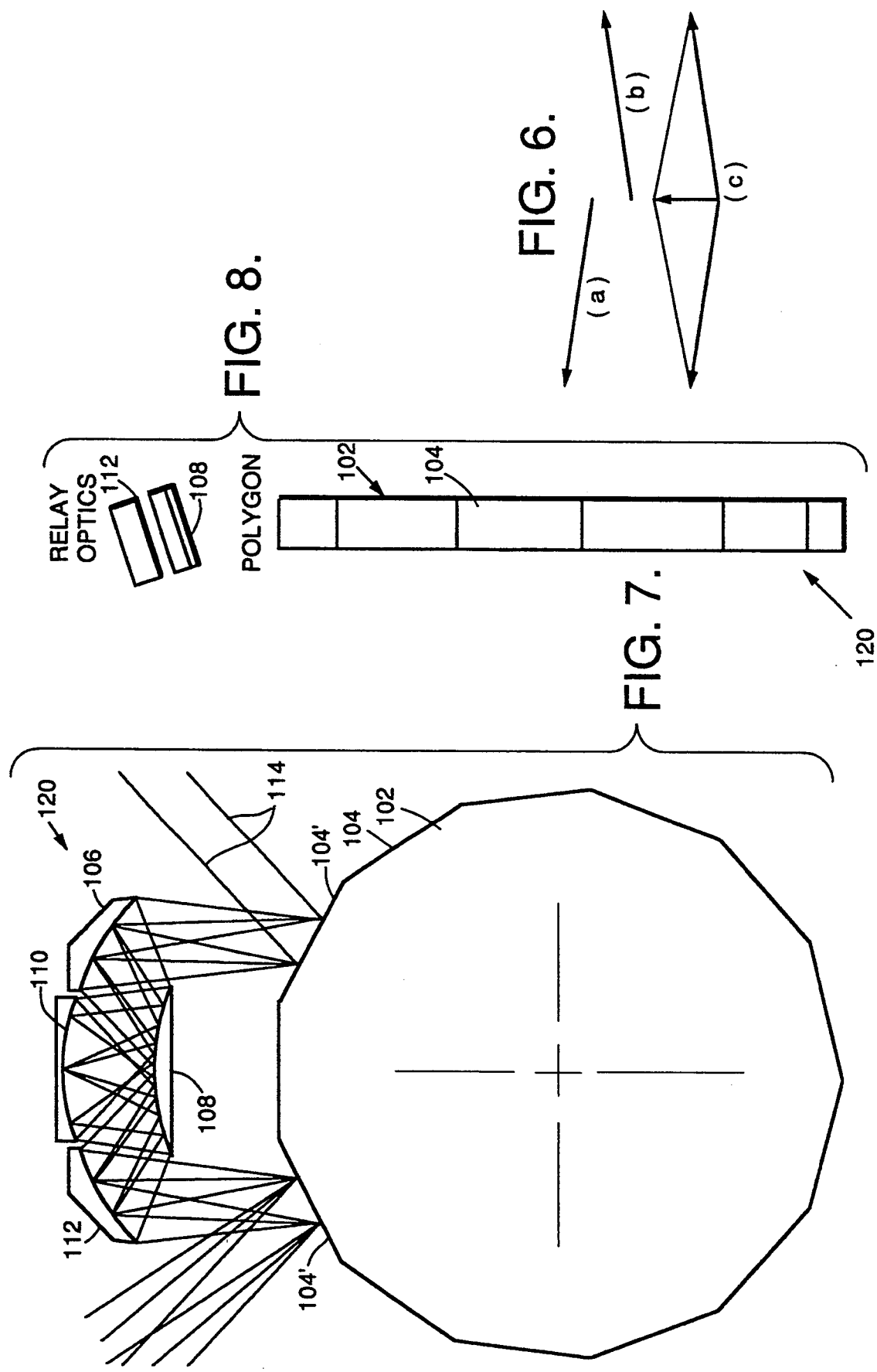

METHOD OF OBTAINING A NARROW FIELD OF VIEW SCAN

BACKGROUND OF THE INVENTION

1. Technical Field

This invention relates generally to a scanning device, and more specifically, to a scanning device incorporating a polygon scanning wheel and a magnification device for achieving both high speed and narrow field of view.

2. Discussion

In certain image acquisition systems, such as an integrated forward looking infrared (FLIR) laser radar imaging system, it is sometimes desirable to make a detailed scan of possible target locations in a larger imaged scene. Because these small target locations are generally a small portion of the overall scene, which may include a multitude of target locations, it is desirable to incorporate narrow or small angle field of view scanning having very fast scanning capabilities. An adequate combination of both high speed of scanning and small angle field of view has heretofore not been achievable in the prior art scanning systems.

As discussed above, it is necessary to achieve a reasonably high scan rate. Generally, it is required that a polygon-type scanner or an acoustooptic scanner be used to realize these scan speeds. For a polygon scanning wheel, the angular size of the scanned field of view is in an inverse relation to the number of facets the scanning wheel has. Therefore, in the prior art, a large number of facets were required for a narrow field of view. Further, a certain minimum number of incident beam diameters are required to impinge on a single facet to alleviate vignetting near the ends of the scan. As a result of at least these two conditions, for a scanning device having a very narrow field of view, the diameter of the scanning wheel will be unreasonably large. For the acoustooptic scanner, size constraints also become a problem, and further, optical transmission of the acoustooptic scanner is generally inadequate.

What is needed then is a polygon-type scanning wheel capable of achieving the desirable high scan rate, but which does not suffer from the size requirements of an appropriately numbered multi-faceted wheel of the prior art. It is therefore an object of the present invention to provide such a scanner.

SUMMARY OF THE INVENTION

Disclosed is a scanning system incorporating a polygon scanning wheel having a plurality of facets. The scanning wheel is rotated at a predetermined rate of speed in order to scan a desirable scene to be imaged. To accomplish the imaging, a beam of light, generally from a radiation source, will impinge on one facet of the polygon scanning wheel. The beam will then be reflected off of the facet and directed through an optical subsystem. The optical subsystem will, inter alia, invert the beam and re-direct the beam to impinge on another facet of the polygon scanning wheel. By directing the beam onto the second facet of the wheel after it has been inverted, the scanning direction of the complete optical system scan due to the second facet will be in a direction opposite to the system scan due to the first facet. The optical subsystem is selected such that not only is the scanning direction reversed, but the scanning direction is reversed in such a fashion that the scan from the second facet does not completely cancel out the scan from the first facet. A reflected return beam from the scene to be imaged retraces the beam path. Since a small portion of the original scan remains, a small angle scan of the scene is realized.

In a first type of scanning system of the present invention, the optical system includes a magnification subsystem arranged between the two scanning reflections. The magnification subsystem will both invert and either magnify or demagnify the beam of light, and correspondingly invert and demagnify or magnify the angle of scan of the beam. If the beam were not altered by magnification, the second reflection would completely cancel out the scanning created by the first reflection. However, since the first reflected beam is magnified or demagnified by the time it is re-reflected off the polygon scanner, the second scanning angle will be larger or smaller than the original scanning angle by an amount representative of the magnification. Consequently, a small portion of the scanning is not cancelled out. Therefore, a small portion of an overall scene can be quickly scanned without the requirement of an oversize wheel diameter having an unmanageable number of facets.

Also disclosed is a second type of scanning system similar to that described above, except that rather than the use of an optical magnification subsystem between reflections off the two facets, an optical subsystem that inverts the beam and changes its degree of collimation is used; that is, the amount of convergence or divergence of the beam. The amount of scanning generated at the target position of the complete optical system depends on the degree of collimation at each scanner reflection, so the scanning induced by the second facet reflection will be larger or smaller than that induced by the first. The inversion causes the two scannings to be in opposite directions, so all except a small portion is cancelled out.

A third method of achieving a small angle scan is also disclosed. In this third implementation, the beam is again reflected off of one facet of the polygon scanning wheel and re-directed onto a second facet of the wheel. However, unlike the first system where the beam is magnified between the two reflections, or the second system where the focal state of the beam between the two deflections is altered, in this optical system the two scans are directed in almost, but not exactly, opposite directions. In other words, the first facet will cause a scan in one direction, and the second facet will cause a scan in substantially the opposite direction. The two scans will not quite entirely cancel each other out, leaving a small angle scan in a direction substantially perpendicular to the first and second scans.

Specific scanning systems may also combine the magnification, vergence, and beam direction concepts disclosed above.

Additional objects, advantages, and features of the present invention will become apparent from the following description and appended claims, taken in conjunction with the accompanying drawings.

BRIEF DESCRIPTION OF THE DRAWINGS

FIG. 6 is a vector diagram of the resultant scans of the third preferred embodiment of the present invention;

FIG. 7 is a narrow field of view polygon scanner according to a third preferred embodiment of the present invention incorporating an all-reflective optical system; and FIG. 8 is a side view of the third preferred embodiment of FIG. 6.

DETAILED DESCRIPTION OF THE PREFERRED EMBODIMENTS

The following description of the preferred embodiments are merely exemplary in nature and are in no way intended to limit the invention or its application or uses. It will be understood that the term magnification used throughout the discussion will be used to exemplify both enlarging or reducing optics.

Figure 1:
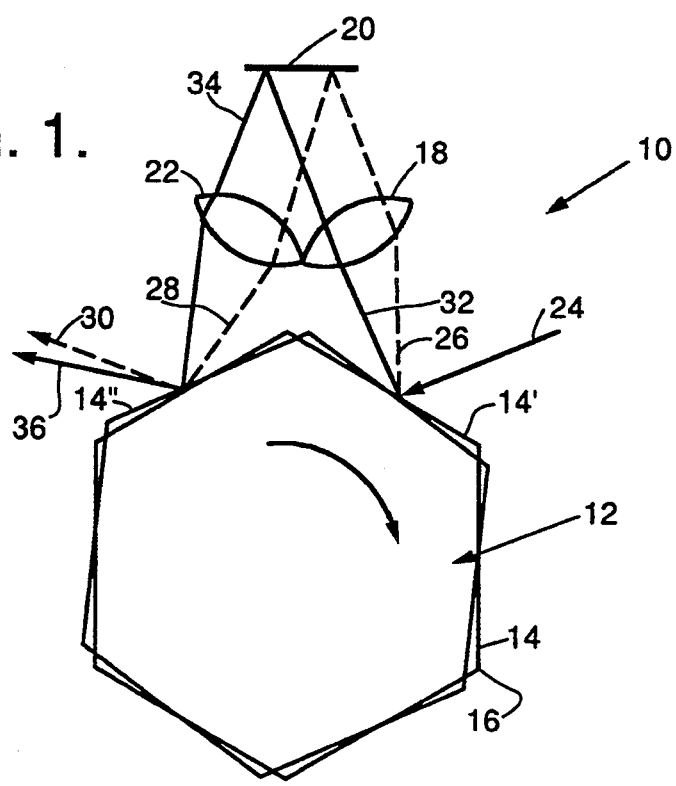
FIG. 1 is a narrow field of view polygon scanner according to a first preferred embodiment of the invention incorporating a simple astronomical-type telescope.

First turning to FIG. 1, a small angle field of view scanner according to a first preferred embodiment of the present invention is shown generally at 10. Small angle field of view scanner 10 incorporates a polygon scanning wheel 12 in an initial position, and in a subsequent position shown in phantom. Polygon scanning wheel 12 includes a plurality of facets 14, here six (6), having edge portions 16 between the individual facets 14. At an upper location above polygon scanning wheel 12 is an astronomical-type telescope incorporating a bi-convex objective lens 18, a redirecting mirror 20, and a bi-convex secondary lens 22. It is noted that the lenses 18 and 22 can be any combination of lenses, mirrors, and other optics to form the well known astronomical-type telescope. Further, the sequence or alignment of lenses 18 and 22 (or other optics) and mirror 20 can be in any configuration that satisfies the requirements discussed below.

A beam of light 24 from a radiation source (not shown), generally an infrared laser, is reflected off of a facet 14' of polygon scanning wheel 12 (in its initial position) as reflected beam 32 and is directed through objective lens 18. Reflected beam 32 is redirected by mirror 20 as beam 34 to impinge on secondary lens 22, the combination of lenses 18 and 22 and mirror 20 forming an astronomical-type telescope of a magnification of approximately one (1). Beam 34 is then directed onto another facet 14" of scanning wheel 12 (in its initial position) and is reflected to other system components (not shown) as output beam 36. Beam 36 will eventually be scanned across a desirable scene and be reflected from the scene back through the path as described above to create an image by means well known to those skilled in the art.

Scanner 10 includes means (not shown) for rotating scanning wheel 12 about an axis. When polygon scanning wheel 12 is in a subsequent rotated position of a scan, as shown in phantom, incident beam 24 is again reflected off of facet 14' as reflected beam 26, shown here as a dotted line. Reflected beam 26 is directed through objective lens 18 as above, redirected by mirror 20, and directed through secondary lens 22 to be reflected off of facet 14" as reflected beam 30 as shown.

As is apparent, beams 34 and 28 are incident on facet 14" at about the same location. This characteristic is obtained by the choice of the focal lengths and locations of the elements of the astronomical telescope such that the telescope images facet 14' onto facet 14". Such an imaging relationship is not required for the small angle scanning property, but it improves the efficiency of the optical system by preventing beam 28 from moving off or partially off facet 14" while facet 14' is still under beam 24.

Figure 2:
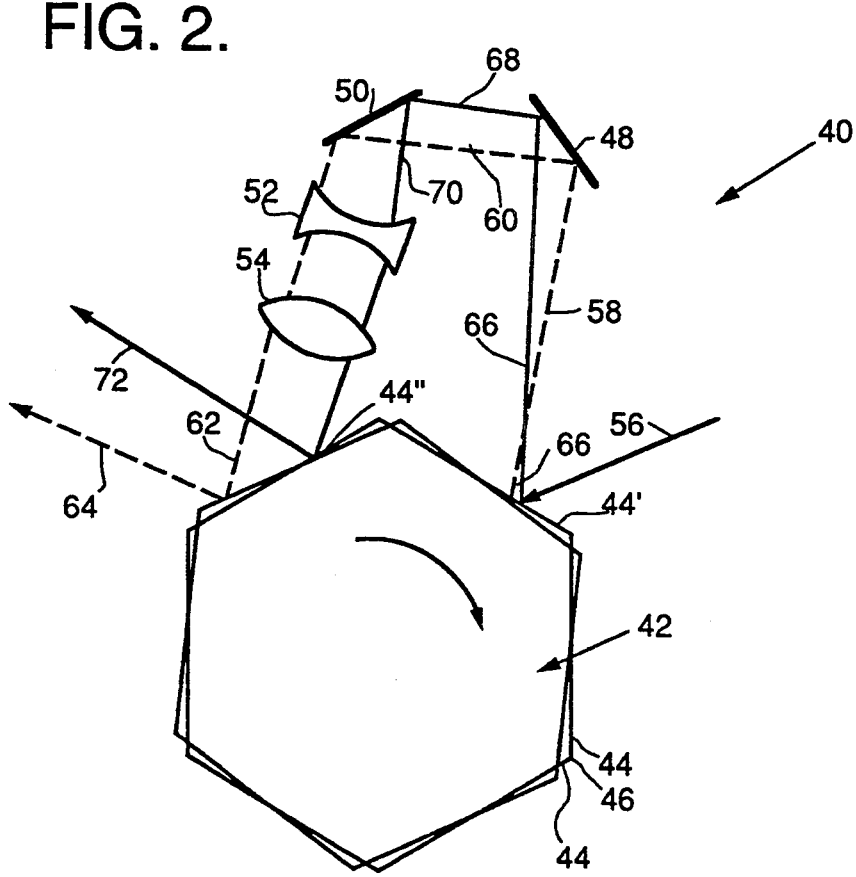
FIG. 2 is a narrow field of view polygon scanner according to the first preferred embodiment of the present invention incorporating a Galilean-type telescope.

Now turning to FIG. 2, another narrow field of view scanner 40 according to the first preferred embodiment of the present invention incorporating another type of optical system is shown. Scanner 40 includes a polygon scanning wheel 42 similar to that of polygon scanning wheel 12 also incorporating a plurality of facets 44. Once again, polygon scanning wheel 42 is shown as including six (6) facets 44 having edge portions 46 between them. Instead of the astronomical-type telescope of the embodiment of FIG. 1, FIG. 2 incorporates a Galilean-type telescope. The Galilean-type telescope, as shown, includes a bi-concave lens 52 and a bi-convex lens 54. Other lens combinations, including planar convex and concave lenses, doublets, etc., can be used to replace lenses 52 and 54 without departing from the Galilean-type telescope. In addition, redirecting mirrors 48 and 50 are incorporated to invert and direct an incident beam 56 back towards polygon scanner 42. As with the first embodiment, different combinations and alignments of lenses 52 and 54 and mirrors 48 and 50 can be utilized to achieve the same results of magnification and inversion of beam 56.

Incident beam 56, from a radiation source (not shown), is reflected off of one facet 44' of polygon scanning wheel 42 (in its initial position, as shown in solid) as reflected beam 66 and is directed onto first redirecting mirror 48. A second reflected beam 68 is reflected off of the first redirecting mirror 48 onto the second redirecting mirror 50. It is the combination of redirecting mirrors 48 and 50 that inverts the resulting scan imparted to incident beam 56. An inverted beam 70 is reflected from the second redirecting mirror 50 through lenses 52 and 54 to provide beam magnification and onto another facet 44" of polygon scanning wheel 42. Reflected beam 70 is reflected off of facet 44" as beam 72, which is directed to scan the scene as above. Once again, a reflected beam from the scene retraces this path to be imaged.

When polygon scanning wheel 42 is in a subsequent scan position, as shown in phantom, incident beam 56 is reflected off of facet 44' as reflected beam 58 onto first redirecting mirror 48, and is reflected off of mirror 48 as reflected beam 60. Beam 60 is reflected off of second redirecting mirror 50 as an inverted beam 62. Inverted beam 62 travels through both lenses 52 and 54 as described above. Reflected beam 62 is then reflected off of facet 44" of polygon scanning wheel 42 as outgoing beam 64. As is apparent, beam 62 does not impinge onto facet 44" at substantially the same location as beam 70, as was the case with beams 28 and 34 on facet 14". This drawback generally produces an undesirable beam motion on facet 14".

The polygon scanning wheels 12 and 42 as described above, along with the two types of telescopes, provide a means by which a small angle field of view can be scanned utilizing a single polygon scanning wheel without incorporating an over abundance of facets. Both the astronomical-type and Galilean telescopes, with one and two fold mirrors, respectively, invert the beam such that the reflection off of the second facets 14" and 44" steers or scans the output beam in the opposite direction from the first reflection off of facets 14' and 44". Because of this beam inversion, the scanning direction of the second reflection would normally cancel out the scanning of the first reflection if the magnification were one. However, the lenses 18, 22, 52, and 54 are selected such that the magnification of the telescope optics is slightly different than one, whether it be slightly less or more than one.

It should be noted that beam size and scan angle are inversely related. That is, when the beam diameter is changed by a factor M, the scan angle is changed by a factor $1/M$. Here, we are concerned about the magnification of the scan angle, not necessarily the beam size. Therefore with this arrangement, the net scanning is $(1-1/M)$ of the first reflection, where M is the magnification of the telescope optics. For example, if the magnification is $M=1.1$, then the net or overall scanning is $0.09 \times (1-1/1.1)$ the scanning of the first reflection. Consequently, the second reflection off of the polygon scanning wheel does not completely cancel the scan from the first reflection off of the polygon wheel, and thus, an overall scanning is achieved having a much smaller scan angle than could normally be acquired with a single polygon scanning wheel of the prior art having a relatively small number of facets. Therefore, it can be realized that a small scan angle field of view can be generated.

Telescope optics other than the simple refractive ones shown in FIGS. 1 and 2 can be incorporated, including all types, combinations, and hybrids of reflective, refractive, and diffractive elements.

The Galilean-type telescope and the astronomical-type telescope offer different characteristics for narrow field of view scanning. Specifically, the Galilean-type telescope leads to beam motion on facet 44". This is apparent in FIG. 2 since beam 56 is ultimately reflected off of two locations on facet 44", as beams 64 and 72, as the scanning wheel 42 is rotated. The astronomical-type telescope can image the incoming beam 24 incident on the first fact 14' onto the second facet 14". This is apparent from FIG. 1 since reflected beams 28 and 34 are incident upon substantially the same point on facet 14". The selection of specific lens focal lengths and positions provides the means by which the first facet can be imaged on the second facet. This imaging enables the first facet to be imaged on the second facet regardless of the angle of incidence of the beam on the first facet. However, certain system constraints such as the size of the facets, tilting of the facets with respect to the line of sight of the telescope, and moving of the facets as the polygon rotates prevents the imaging from being pure.

Figure 3A:
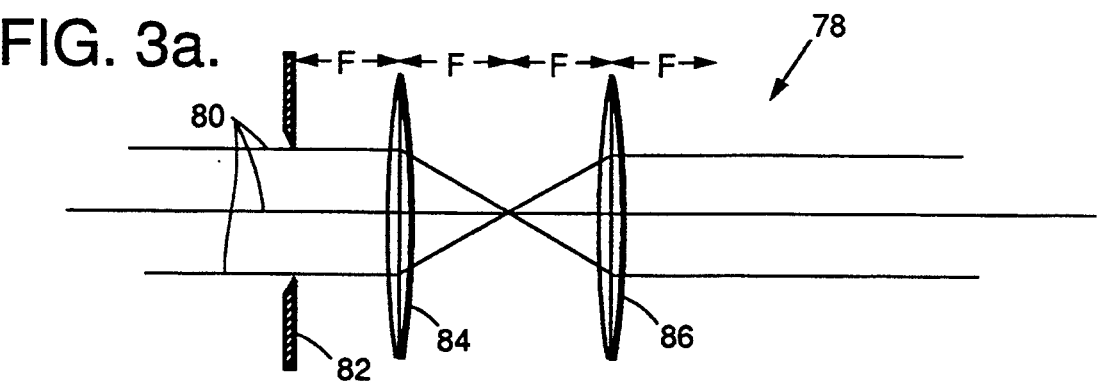
FIGS. 3a–3e are optical systems showing imaging of an entrance pupil onto an exit pupil.

FIGS. 3(a)-3(e) are included to show the advantages of imaging the first facet onto the second facet by means of optical pupils. FIG. 3 is an astronomical telescope system 78 with a magnification of unity; that is, two simple lenses of focal length f separated by twice their focal lengths. Assume the arriving light is from a distant source. This light is then made up of parallel rays 80 (collimated light), which generally illuminates the entire front of system 78 such that the entire portion within a physical entrance aperture 82 enters the system. In FIG. 3a, the collimated beam of light 80 arrives from the left, is brought to a focus by a first lens 84, reexpands, and is recollimated by a second lens 86. The physical aperture 82 proximate the first lens 84 limits the size of the beam of light that can enter the system 78 and as such can be varied to achieve the desirable beam size.

Figure 3B:
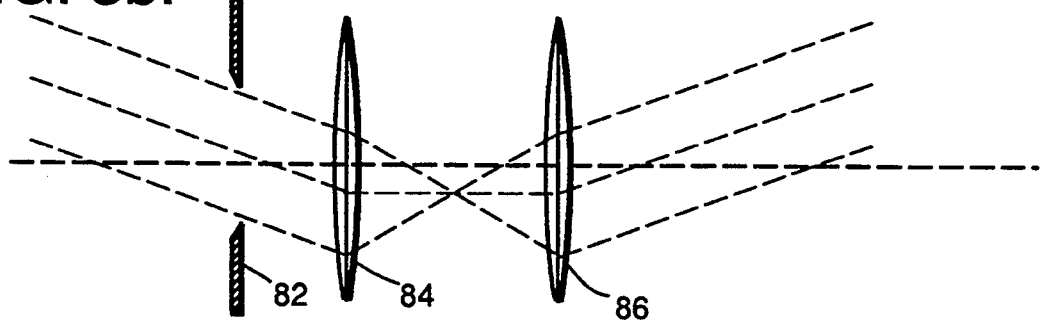
Figure 3C:
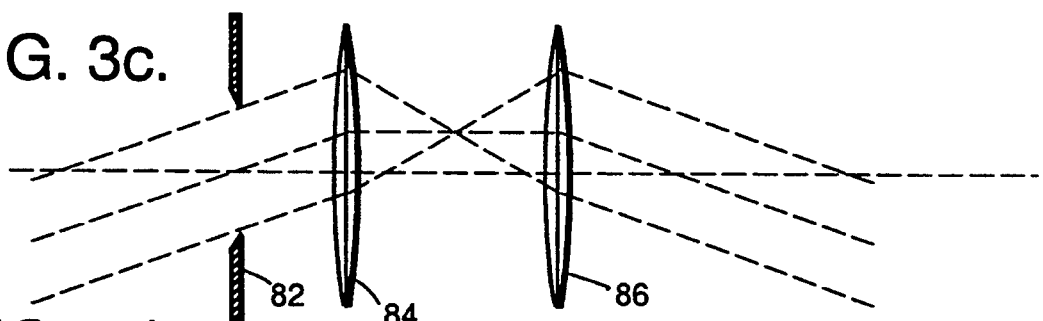
Figure 3D:
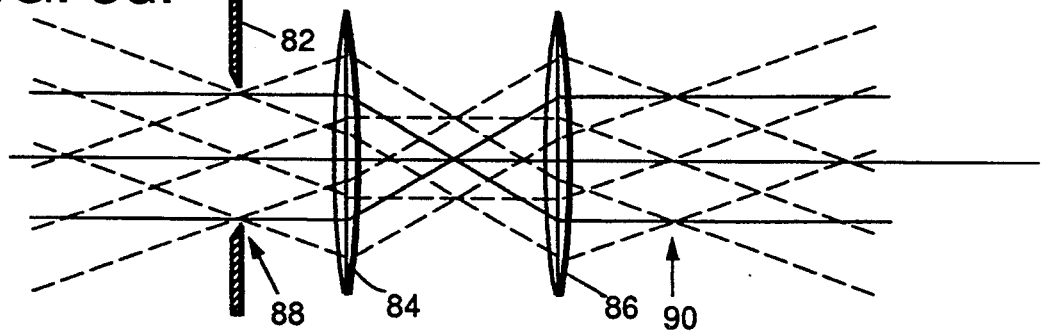

FIG. 3b is the same situation, but for a source above the source of FIG. 3a. FIG. 3c is again the same, but for a source below the source of FIG. 3a. FIG. 3d is FIGS. 3a, 3b, and 3c drawn on top of each other. Note how all three beams fill the entrance aperture 82. The region containing all entering beams and completely filled by them is called the entrance pupil 88. Ahead or behind the plane of the entrance pupil 88, the beams separate and any selected region of one of these planes will either not completely contain all of the entering beams or portions of the region will not be filled by all of the beams. To the right of system 78 there is a second region completely filled by the beams, the exit pupil 90. The exit pupil 90 is also the smallest region that contains all the light leaving the system, just as the entrance pupil 88 is the smallest region containing all the light entering the system.

Figure 3E:
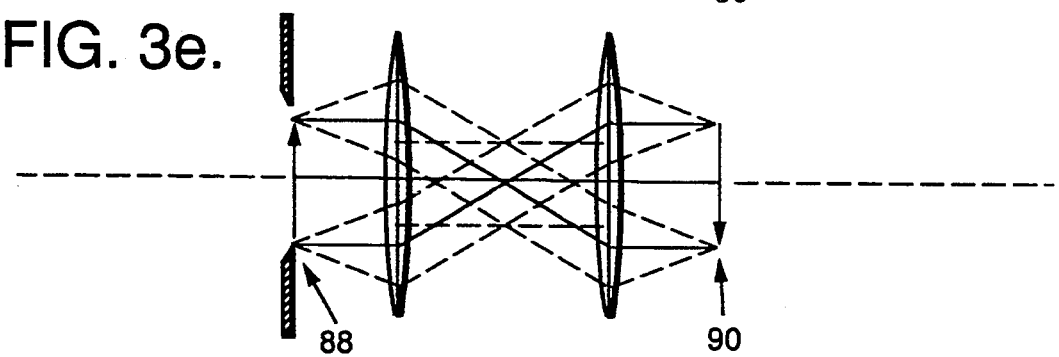

FIG. 3e is a recreation of FIG. 3d, but with all the parts of the rays to the left of the entrance pupil 88 erased, and with all parts of the rays to the right of the exit pupil 90 erased. Now it is apparent that the exit pupil 90 is an image of the entrance pupil 88, or vice versa. In other words, they are conjugates of each other. Rays from the top of the entrance pupil 88 are focused by the second lens 86 to the bottom of the exit pupil 90; rays from the center of the entrance pupil 88 are focused by the second lens 86 to the center of the exit pupil 90; and rays from the bottom of the entrance pupil 88 are focused by the second lens 86 to the top of the exit pupil 90. By varying the distance between the entrance aperture 82, and thus the entrance pupil 88, and the first lens 84, the exit pupil will also be varied relative to the second lens 86.

If a source (not shown) of collimated light is placed at the entrance pupil 88 and steered around, the optical system 78 will image that source so that to someone looking into the system from the right, the source appears to be at the exit pupil 90. FIGS. 3a-3e are drawn for a telescope with unity magnification, so the beam diameter and steering angle of the exit are the same as at the entrance. It is for this reason that this type of system is often referred to as a relay system. If the telescope had magnification of M, the beam diameter would be reduced by a factor of M and the steering angle would be increased by a factor of M. Relay systems can have magnifications other than 1. The use of the term "relay" is more a function of the reason for the use of the optics; if the purpose is more to move a pupil to another location, then the optics will be called relay optics, even if there is some magnification involved.

The astronomical telescope of FIG. 1 is generally an afocal telescope. What this means is that the beams that impinge facet 14' are collimated as are the beams that are reflected from facet 14". As described above, the focal lengths and positions of the lenses 18 and 22 are selected such that the facet 14' is imaged onto the facet 14" and the afocal characteristic is realized. This concept attempts to help eliminate the undesirable beam walking on facet 14".

The requirement that the incident beam 24 be collimated as well as the outgoing beam 36 is not necessarily a requirement of the system. There are a number of practical reasons why a designer would not choose to image the impingement point of beam 24 on facet 14' onto facet 14". In fact, the positions of lenses 18 and 22 or mirror 20 of FIG. 1 can be altered such that an incident collimated beam is not collimated once it traverses the telescope optics and still achieve the desirable characteristics of the invention without requiring any magnification. In addition, the beam of light can be altered such that a non-collimated beam of light incident on the scanner is collimated by the telescope optics.

Figure 4:
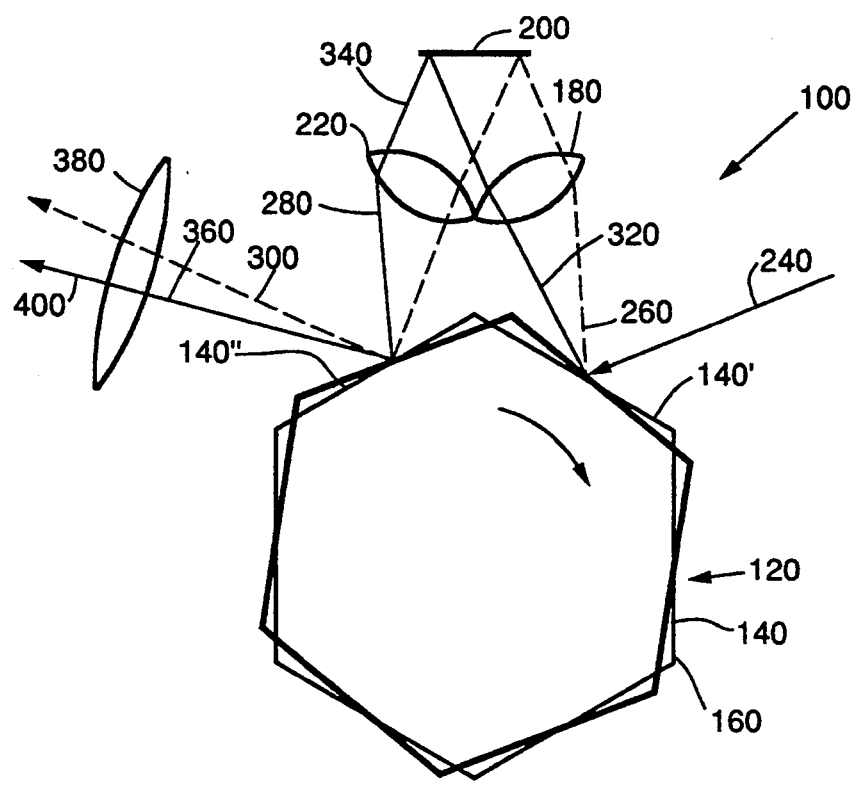
FIG. 4 is a narrow field of view polygon scanner according to a second preferred embodiment of the present invention incorporating a simple astronomical-type telescope and a collimating lens.

Turning to FIG. 4, a second concept representing a second preferred embodiment of the present invention is disclosed. FIG. 4 includes a nearly identical astronomical telescope to that of FIG. 1. In FIG. 4, like components have the same reference numerals followed by a zero to that of FIG. 1. One of the focal lengths of lens 180 or 220 has been altered from that of lens 18 or 22 of FIG. 1, or the position of one of lenses 180 or 220 or mirror 200 has been altered to affect the collimation of the light beam. For this embodiment, incident beam 240 is collimated, but reflected beam 360 is either converging or diverging. A third positive lens 380 is included in the path of beam 360 to collimate it such that an outgoing beam 400 is collimated. In a real system, it may not be necessary to collimate the output, as there is usually some following optics, such as a transmit/receive telescope, and therefore any required focus can be absorbed in that. Alternatively, the input beam may be slightly out of collimation and the scanner telescope collimates it to achieve the same result.

It is the technique of altering the collimation from non-collimated to collimated or collimated to non-collimated or changing the amount of non-collimation between the first facet and the second facet by the telescope optics that offers an alternative to magnification in order to develop a small angle scan. Since the fundamental concept of this invention is to generate an imbalance in the scanning impressed by two reflections off of the same scanner wheel, this imbalance may also be obtained from slightly different amounts of convergence or divergence of the beams incident on the two facets. As such, this imbalance can be obtained from a combination of focal states and beam sizes. Since the scanning caused by the second facet is in a reverse direction to the scanning caused by the first facet, a change in beam convergence or divergence will provide a different size scanning as was true with the magnification concept. In other words, if a beam incident on a scanner facet is not collimated, the amount of scanning obtained when the beam is eventually collimated (or brought to some other reference focal state) is changed.

Figure 5:
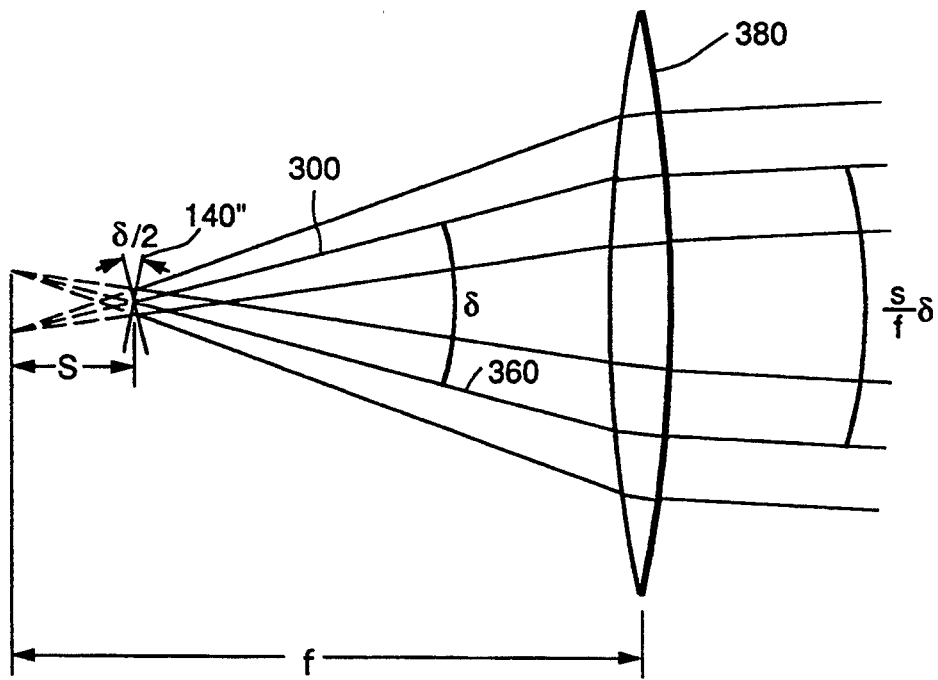
FIG. 5 is an optical system showing the effect of scanning a facet in a non-collimated region of an optical system.

FIG. 5 shows how a scanning of amount δ in a divergent beam becomes a smaller scanning when brought into collimation. If one facet reflection on the scanner wheel is collimated and is scanned by amount δ, and the other facet reflection is divergent, the net scan with an inversion between the two reflections will be:

$$\delta - \frac{S}{F} \quad \delta = \delta\left(1 - \frac{S}{F}\right);$$

where S is the distance between the facet and the focal point of the lens and F is the focal length of the lens.

Consequently, if the beam is only slightly out of collimation, that is, S≈F, the net scan is much less than δ.

Returning to FIG. 5, a reconstruction of second facet 140" and third positive lens 380 is shown. In this example, facet 140" is shown in a first position and a second position, representing a rotation of the polygon scanning wheel 120. The difference between the first and the second positions is an angle δ/2. Outgoing rays with central ray 300 can be seen leaving facet 140" when it is in its first position and outgoing rays with central ray 360 can be seen leaving facet 140" when it is in its second position. As is apparent, the angle between a ray 300 and a ray 360 is δ. Once rays 300 and 360 traverse third positive lens 380 the angle between them is altered. The angle between them after rays 300 and 360 have traversed lens 380 is S/F times δ. Consequently, a scanning of amount δ in a non-collimated beam is reduced to a smaller angle scanning when the beam is brought back into collimation as shown in FIG. 5. The reduction in scanning from facet 140" thus enables a resultant small scan of the whole system in FIG. 4 since the scanning of the first facet is opposite to that of the scanning of the second facet, as described above.

Instead of magnifying or demagnifying the beam as in the concept of the first preferred embodiment, or altering the collimation of the beam as in the concept of the second preferred embodiment, the concept of the third preferred embodiment varies the scan direction to achieve the small angle scan. This can be illustrated in FIGS. 6(a)-6(c). The arrows in FIG. 6 are vectors representing the path followed on a target area by the scanning system output beam. FIG. 6(a) shows a scan in one direction such as would be obtained if only the first facet of the polygon scanning wheel moved. FIG. 6(b) shows a scan in a substantially opposite direction to that of FIG. 6(a), such as would be obtained if only the second facet of the polygon scanning wheel moved. FIG. 6(c) shows the aggregation of the two scans of FIGS. 6(a) and (b) due to the real motion of the whole wheel. As is apparent, the small scan in the vertical direction represents the scan that would be achieved from this cancellation. By this it can be seen that two scans in substantially opposite directions can almost cancel to yield a small angle scan.

Now turning to FIG. 7, a small angle field of view scanner system 120 according to a concept representing the third embodiment of the present invention is shown. System 120 includes an all-reflective optical relay system including a re-imaging and derotation optical system as disclosed in U.S. patent application Ser. No. 07/563,124, filed Aug. 8, 1990, now U.S. Pat. No. 5,078,502, herein incorporated by reference. System 120 includes a polygon scanning wheel 102 including a plurality of facets 104. Further, an optical system comprising an array of mirrors including a primary mirror 106, a secondary mirror 108, a third mirror 110, and a fourth mirror 112 is positioned relative to scanning wheel 102 substantially as shown.

An incident beam having rays 114 impinges a first facet 104' of polygon scanning wheel 102. Beam 114 is then reflected off of facet 104' and directed to primary mirror 106 as shown by the bold rays. (The light rays represent paths reflected beam 114 takes when the polygon scan wheel is at earlier and later rotated positions.) Beam 114 is then reflected from primary mirror 106 onto secondary mirror 108, then reflected from secondary mirror 108 onto third mirror 110, back to secondary mirror 108 and onto fourth mirror 112 as shown. Beam 114 is then reflected off of mirror 112 onto a second facet 104″ of polygon scanning wheel 102, as above. In this configuration, the mirror system has a magnification of unity and is afocal, so the two scanning reflections would completely cancel out.

The totally reflective scanning system 120 as shown in FIG. 7 provides a representation of a system that can achieve the scanning effects as shown in FIG. 6. Specifically looking at FIG. 8, the reflective relay lens system is shown tilted about an axis in the plane of the polygon scanning wheel 102. In this FIG., fourth lens 112 and secondary lens 108 are shown in a side view. Consequently, beam 114 is scanned in one direction by facet 104′, and scanned in a substantially opposite direction by facet 104″, however, a small angle scan remains. It is noted that the scanning direction of the two facets in this third preferred embodiment are purposely made in directions that are not exactly opposite, whereas the scanning directions of the other two embodiments are generally in opposite directions.

The symmetry of the design of FIG. 7 is what cancels out most of the aberrations. Consequently, the all-reflective design will not work as well if the tilt of FIG. 8 is removed and the magnification is changed from unity. Therefore, the method of magnification of the first preferred embodiment disclosed in FIGS. 1 and 2 suffers some drawbacks in a completely reflective system as shown in FIG. 7. However, system 120 can be altered such that it is a focal system as discussed in the second preferred embodiment of FIG. 4. This can be accomplished by removing the tilt of FIG. 8 and altering the position of secondary mirror 108 such that it is positioned farther away from the other three mirrors 106, 110, and 112. By this, the two scans will not quite cancel each other out for the reasons as discussed above for FIGS. 4 and 5.

In concept, the reflective system 120 is the same as the astronomical telescope lens system of FIGS. 1 and 4. The combination of mirrors 106 and 108 are equivalent to lens 18 of FIG. 1 and lens 180 of FIG. 4. Further, mirrors 108 and 112 are equivalent to lens 22 of FIG. 1 and lens 220 of FIG. 4. And finally, mirror 110 is equivalent to mirror 20 of FIG. 1 and mirror 200 of FIG. 4. Mirror 110 is curved to reduce aberrations caused by the large off-axis angles and further to act as a field mirror.

The above-described small angle field of view scanners provide for a number of situations not applicable to the prior art scanners. For one specific example, a field of view of six mrad azimuth, at three mrad elevation, scanned in 25 msec with 100 μrad pixels, from a 10.6 μm laser having a 15 cm aperture was not effectively possible with prior art scanners. This example requires 1200 scan lines per second, each having six mrad lengths. Heretofore, the only scanning devices that could scan at 1200 lines per second were polygon scanners or acoustooptic scanners. However, neither one of these prior art devices was applicable to be used in a 15 cm object space. With a 12X telescope, the beam diameter is brought down to 1.25 cm and the scan angle increased to 72 mrad azimuth at 36 mrad elevation.

These larger scan angles are within the range of an acoustooptic scanner, known to those skilled in the art. However, acoustooptic scanners are generally not desirable because they do not provide enough optical transmission. In addition, for the above-described scan angles, a polygon scanning wheel of the prior art is not practical. A polygon scanning wheel scans an angle equal to twice the angular subtense of a facet. For the above example, each facet would have to subtend 36 mrad, which would then require 175 facets. Since each facet must be at least four beam diameters in dimension to avoid severe vignetting at the ends of each scan (at the edges of the facets), the wheel must have a circumference of 870 cm. Such a large diameter scanning wheel is impractical in a real application.

For the disclosed invention, a polygon scanning wheel having 14 facets can be used to achieve the above-described example. The first reflection off of the scanning wheel scans a beam through an angle of $2 \times (360°/14) = 51.43$ degrees. A telescope of magnification $M = 1.09$ reduces the scan angle to $51.43/1.09 = 47.18$ degrees. The reflection off of the second facet of the polygon scanning wheel scans the beam $-51.43$ degrees, for a net scan of 4.25 degrees $= 74$ mrad. With a beam diameter of 1.25 cm, and allowing for a facet dimension of four beam diameters, the scanning wheel will be approximately 8.8 inches in diameter. A scanning wheel of this dimension is much more practical. However, the $1.09 \times$ telescope must have large enough optics to contain the 51.43 degree intermediate scan angle from the first reflection.

The foregoing discussion discloses and describes merely exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A method of obtaining a narrow field of view scan comprising the steps of:
   impinging a beam of light onto a first facet of a multi-faceted polygon scanning wheel;
   rotating the scanning wheel in a scanning sequence;
   magnifying the beam of light reflected from said first facet, said step of magnifying including directing the beam of light through an astronomical-type telescope;
   directing the reflected beam of light from the first facet and onto a second facet of said polygon scanning wheel; and
   causing the reflection off of the second facet to scan in substantially the opposite direction to the reflection off of the first facet.

2. The method according to claim 1 wherein the step of magnifying the reflected beam of light includes directing the beam of light through a series of optical devices, wherein the optical devices magnify and invert the beam of light.

3. The method according to claim 1 wherein the step of directing the beam of light onto a second facet includes directing the beam of light onto at least one mirror such that said beam of light is inverted by said at least one mirror.

4. The method according to claim 1 further comprising the step of altering the vergence of the beam of light as it travels between the first facet and the second facet.

5. A method of obtaining a narrow field of view scan comprising the steps of:
   impinging a beam of light onto a first facet of a multi-faceted polygon scanning wheel;
   rotating the scanning wheel in a scanning sequence;

magnifying the beam of light reflected from said first facet, said step of magnifying including directing the beam of light through a Galilean-type telescope;

directing the reflected beam of light from the first facet and onto a second facet of said polygon scanning wheel; and causing the reflection off of the second facet to scan in substantially the opposite direction to the reflection off of the first facet.

6. The method according to claim 5 wherein the step of magnifying the reflected beam of light includes directing the beam of light through a series of optical devices, wherein the optical devices magnify and invert the beam of light.

7. The method according to claim 6 wherein the step of directing the beam of light onto a second facet includes directing the beam of light onto at least one mirror such that said beam of light is inverted by said at least one mirror.

8. The method according to claim 5 further comprising the step of altering the vergence of the beam of light as it travels between the first facet and the second facet.

9. A method of obtaining a narrow field of view scan comprising the steps of:

impinging a beam of light onto a first facet of a multi-faceted polygon scanning wheel;

rotating the scanning wheel in a scanning sequence;

directing the reflected beam of light from the first facet and onto a second facet of said polygon scanning wheel;

directing the reflected beam of light from the second facet through a collimating lens; and causing the reflection off of the second facet to scan in substantially the opposite direction to the reflection off of the first facet.

10. The method according to claim 9 further comprising the step of magnifying the reflected beam of light from said first facet.

11. The method according to claim 10 wherein the step of magnifying the reflected beam of light includes directing the beam of light through a series of optical devices, wherein the optical devices magnify and invert the beam of light.

12. The method according to claim 9 further comprising the step of altering the vergence of the beam of light as it travels between the first facet and the second facet.

13. A method of obtaining a narrow field of view scan comprising the steps of:

impinging a beam of light onto a first facet of a multi-faceted polygon scanning wheel;

rotating the scanning wheel in a scanning sequence;

directing the reflected beam of light from the first facet and onto a second facet of said polygon scanning wheel;

causing the reflection off of the second facet to scan in substantially the opposite direction to the reflection off of the first facet, including directing the beam through an optical system such that the optical system substantially but not entirely reverses the scanning direction of the beam to achieve a small angle field of view scan.

14. The method according to claim 13 wherein the step of directing the beam through an optical system includes directing the beam through an optical system comprised of a plurality of prearranged mirrors.

15. The method according to claim 14 wherein the step of directing the beam through a plurality of mirrors includes positioning the mirrors in a plane slightly tipped from the plane of the polygon scanning wheel.

16. The method according to claim 13 further comprising the step of altering the vergence of the beam of light as it travels between the first facet and the second facet.

* * * * *